F. CASTLE.
FARM GATE.
APPLICATION FILED OCT. 3, 1917.
1,253,783.  Patented Jan. 15, 1918.
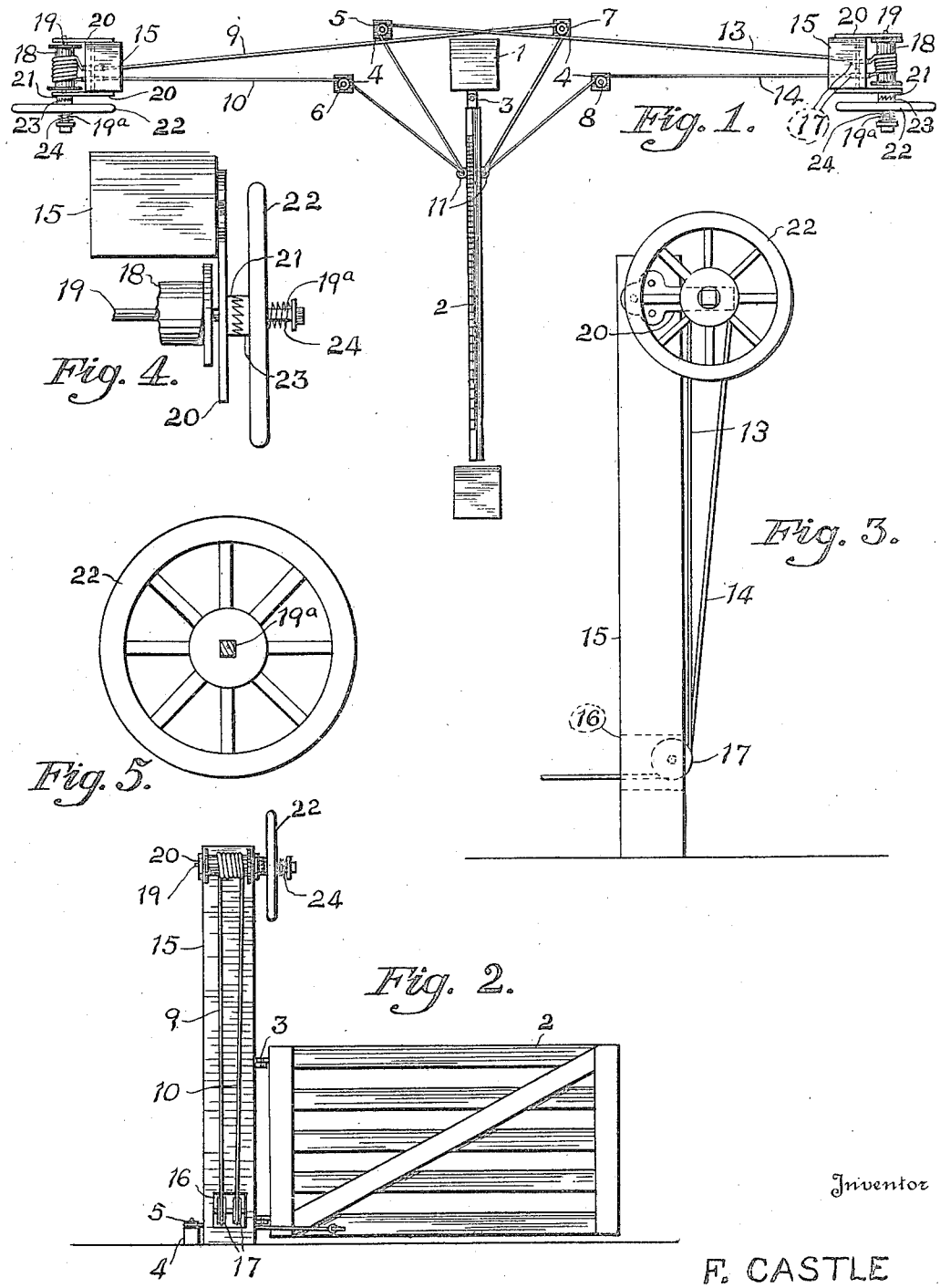

UNITED STATES PATENT OFFICE.

FRANK CASTLE, OF SPRIGG, WEST VIRGINIA.

FARM-GATE.

1,253,783.  Specification of Letters Patent.  Patented Jan. 15, 1918.

Application filed October 3, 1917.  Serial No. 194,488.

*To all whom it may concern:*

Be it known that I, FRANK CASTLE, a citizen of the United States, residing at Sprigg, in the county of Mingo, State of West Virginia, have invented a new and useful Farm-Gate; and I do hereby declare the following to be a full, clear, and exact description of the invention, such as will enable others skilled in the art to which it appertains to make and use the same.

The present invention relates to a gate opening mechanism, and has for its object to provide a device of this character which embodies novel features of construction whereby a gate can be opened and closed by the driver of an approaching and departing vehicle without the necessity of dismounting from the vehicle.

Further objects of the invention are to provide a gate opening mechanism which is comparatively simple and inexpensive in its construction, which can be easily manipulated to open and close the gate without dismounting from a horse or vehicle, which can be operated from either side of the gate with equal facility, and which has no delicate parts and is adapted to withstand the rough usage to which such devices would ordinarily be subjected in practice.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a gate opening mechanism constructed in accordance with the invention.

Fig. 2 is a side elevation of the same.

Fig. 3 is a front elevation of one of the standards and operating wheels.

Fig. 4 is a top plan view of one of the standards and operating means, portions being broken away.

Fig. 5 is a front elevation of one of the operating wheels, the square end of the shaft upon which the wheel is slidably mounted being shown in section.

Corresponding and like parts are referred to in the following description and indicated in all the views of the drawings by the same reference characters.

Specifically describing the present embodiment of the invention, the numeral 1 designates a gate post, and 2 a conventional gate which is mounted upon the gate post by means of the hinges 3, the said gate being adapted to open in either direction. A pair of pulleys are arranged upon each side of the gate post, said pulleys being adapted to be mounted upon any suitable support such as the stakes 4. The pulleys 5 and 6 are arranged on one side of the gate post, and the pulleys 7 and 8 on the opposite side of the gate post, the corresponding pulleys being disposed in a similar manner, and the pulleys 5 and 7 being in a line back of the gate post, while the pulleys 6 and 8 are arranged in advance of the pulleys 5 and 7 and spaced slightly farther apart.

Extending along one side of the road in one direction are parallel cables 9 and 10 of which the ends thereof adjacent the gate are carried around the respective pulleys 7 and 6 and secured to opposite sides of the gate 2 at a point spaced from the hinged edge thereof, as indicated at 11. With this arrangement it will be obvious that by alternately taking in and letting out the respective cables 9 and 10 the gate 2 can be swung back and forth upon its hinges and moved into an open and closed position. A similar pair of cables 13 and 14 extend along the road in an opposite direction from the cables 9 and 10, said cables passing around the respective pulleys 5 and 8 and being secured to opposite sides of the gate at 11, in exactly the same manner as the cables 9 and 10. By alternately taking in and letting out these cables 13 and 14 the gate may be opened and closed in exactly the same manner as by means of the cables 9 and 10.

Standards 15 are arranged at one side of the road and suitably spaced from the gate on opposite sides thereof. Each of these standards is provided at the bottom thereof with a clearance opening 16 through which the respective set of cables 9 and 10 or 13 and 14 are threaded, the said cables being then carried upwardly around suitable guide members 17 and secured at their extremities to a drum 18 which is horizontally disposed and preferably arranged transversely with respect to the road. Each drum 18 is rigid with a horizontal shaft 19 which is journaled within suitable bearings 20 projecting from the top of the standard, one end of the shaft having a polygonal formation, as indicated at 19$^a$, and the corresponding bearing 20 being formed with a clutch face 21. An operating wheel 22 is slidable upon the polygonal end 19$^a$ of the horizontal shaft and provided with a clutch face 23 adapted to engage the clutch face 21 of the bearing to lock the wheel and shaft against rotation in one direction. The teeth of the clutch faces are, however, inclined so that they will slip over each other and permit the wheel and shaft to turn freely in the opposite direction. A spring 24 normally slides the operating wheel toward the bearing to retain the clutch face 23 of the wheel in engagement with the clutch face 21 of the bearing, and the clutches of the two operating wheels have such a relation to each other that when both of the clutches are closed neither one of the operating wheels can be moved in either direction. However, in order to open the gate from either side, it is merely necessary to slide the operating wheel 22 against the action of the spring 24 to disengage the clutch face 23 thereof from the clutch face 21 and rotate the wheel in the direction which would have been prevented by the square sides of the clutch teeth when the clutch was closed. The rotation of the drum 18 produced by thus turning the operating wheel will wind one of the cables upon the drum and unwind the other cable therefrom in such a manner as to swing the gate into an open position. The other set of cables will be correspondingly moved, and the other drum and operating wheel will be rotated to permit of the opening of the gate, the inclined teeth of the clutch of the other operating wheel slipping over each other as the wheel is rotated. After the driver has passed through the gate, it can be closed by manipulating the operating wheel 22 on the opposite side of the gate in exactly the same manner as the first operating wheel is manipulated. When the gate is closed it will be locked against movement in either direction by the clutches of the two operating wheels which have an opposed relation to each other, so that it is necessary to break one of the clutch connections before either of the operating wheels can be turned to open the gate.

Having thus described the invention, what I claim as new and desire to secure by Letters Patent, is:—

1. A gate opening mechanism, including a gate post, a gate hinged to the gate post, a standard arranged at a distance from the gate post, bearings upon the standard, a shaft journaled within the bearings, a drum upon the shaft, a pair of cables connected to the drum to be alternately wound and unwound therefrom, said cables being operatively connected to the gate, a hand wheel slidable upon the shaft and rotatable therewith, and a clutch controlled by the sliding movements of the hand wheel for normally locking the drum against rotation.

2. A gate opening mechanism, including a gate post, a gate hinged to the gate post, guide pulleys on opposite sides of the gate post, a pair of cables extending away from the gate, the ends of the cables adjacent the gate being carried around the pulleys and secured to opposite sides of the gate, a standard spaced from the gate post, a drum at the upper end of the standard, guide means at the lower end of the standard, the ends of the before mentioned cables remote from the gate being carried around the guide means and carried upwardly to the drum, and means for rotating the drum to alternately take in and let out the cable to open and close the gate.

3. A gate opening mechanism, including a gate post, a gate hinged to the gate post, guide pulleys on opposite sides of the gate post, pairs of cables extending away from the gate in opposite directions, the ends of each pair of the cables adjacent the gate being carried by the pulleys and secured to opposite sides of the gate, standards arranged on opposite sides of the gate, a drum mounted upon each of the standards, the ends of the corresponding pair of cables remote from the gate being secured to the respective drum, a hand wheel for turning each drum, and a clutch for each drum, said clutches being formed with inclined teeth adapted to slip over each other and with square shoulders, the teeth of the two clutches having an opposed relation so that neither drum can be turned in either direction without breaking the clutch connection.

4. A gate opening mechanism, including a gate post, a gate hinged to the gate post, guide pulleys on opposite sides of the gate post, pairs of cables extending in opposite directions from the gate, the ends of each pair of the cables being carried around the pulleys and secured to opposite sides of the gate, standards arranged upon opposite sides of the gate, bearings upon the standards, shafts journaled within the bearings, drums applied to the shafts and having the ends of the respective cables secured thereto, a hand wheel slidable upon each shaft and rotatable therewith, and a clutch for each drum, said clutches being controlled by the sliding movements of the hand wheels and being formed with inclined teeth adapted to slip over each other when the drum is moved in one direction, the clutches each locking the corresponding drum against rotation in one direction and having an opposed relation to each other so that neither drum can be rotated until the corresponding hand wheel is first moved to open the clutch.

In testimony whereof I have signed my name to this specification in the presence of two subscribing witnesses.

FRANK CASTLE.

Witnesses:
 MATTISON E. JUDE,
 MART $\overset{\text{his}}{\times}$ MILLER.
 mark Copies of this patent may be obtained for five cents each, by addressing the "Commissioner of Patents, Washington, D. C."